United States Patent [19]

Easterly

[11] 4,281,807
[45] Aug. 4, 1981

[54] WEB TRANSPORT APPARATUS
[75] Inventor: Donald O. Easterly, Rush, N.Y.
[73] Assignee: Eastman Kodak Company, Rochester, N.Y.
[21] Appl. No.: 126,733
[22] Filed: Mar. 3, 1980
[51] Int. Cl.³ .......................... G03B 1/04; G11B 15/32
[52] U.S. Cl. ..................................... 242/206; 242/208; 226/181; 226/188; 226/194
[58] Field of Search ................ 242/201, 202, 206–210; 226/181, 184, 188, 190, 194

[56] References Cited
U.S. PATENT DOCUMENTS

| | | | |
|---|---|---|---|
| 2,951,653 | 9/1960 | Haenel | 242/201 |
| 3,085,759 | 4/1963 | Guest | 242/210 |
| 3,785,586 | 1/1974 | Engert et al. | 242/201 |
| 3,938,758 | 2/1976 | Totino | 242/208 |
| 4,199,092 | 4/1980 | Rose | 226/181 |

Primary Examiner—Leonard D. Christian
Attorney, Agent, or Firm—J. A. Morrow

[57] ABSTRACT

A web transport apparatus includes a driving member which may be selectively positioned to advance a web from a reel or to rewind the web onto the reel. When positioned in the web advancing position, the driving member advances the web between the driving member and a pressure roller or other suitable pressure member to unwind the web from the reel. When moved to the web rewinding position, the driving member is coupled to and drives the reel to wind the web onto the reel. A flexible coupling provided between the driving member and a unidirectional drive motor permits the driving member to be selectively positioned by selector means to advance, rewind, and neutral positions. Through appropriate controls, the driving member may be deactivated when in the neutral position.

9 Claims, 2 Drawing Figures

4,281,807

WEB TRANSPORT APPARATUS

BACKGROUND OF THE INVENTION

The present invention relates generally to apparatus including unidirectional drive means for transporting a web or flexible strip. More specifically, the invention relates to web transport apparatus including a driving member selectively positionable to unwind a web from a reel or to rewind the web onto the reel.

DESCRIPTION OF THE PRIOR ART

U.S. Pat. Nos. 2,673,041; 2,951,653; 3,062,064; 3,133,710; 3,643,894; 4,010,918; and others generally disclose web-advancing mechanisms including unidirectional motors for driving a capstan/pressure roller combination, flange drives for takeup reels, and the like. However, known references do not disclose the simpler, less costly web transport apparatus of the present invention, wherein a driving member is alternatively positionable for advancing a web between the driving member and a pressure member or for rewinding the web through engagement of the driving member with a reel.

SUMMARY OF THE INVENTION

In accordance with the present invention, a preferred embodiment of a web transport apparatus includes a driving member which is rotatively driven by a unidirectional drive motor. The driving member may be alternatively positioned to advance the web between the driving member and a pressure member or to impart web rewinding rotation to the reel.

A preferred embodiment of the present invention includes a unidirectional drive motor operatively coupled to a driving member which may be positioned in (1) a first position wherein it advances a web between the driving member and a pressure roller or (2) a second position wherein it operatively engages a takeup reel to wind the web thereon. Also, the driving member may be positioned in an intermediate or neutral position where it may be deactivated through appropriate controls.

BRIEF DESCRIPTION OF THE DRAWINGS

For a more complete understanding of the present invention, as well as further advantages and features thereof, reference should be made to the following detailed description of the invention, taken in conjunction with the accompanying drawings, in which.

DESCRIPTION OF THE PRESENTLY PREFERRED EMBODIMENT

Figure 1:
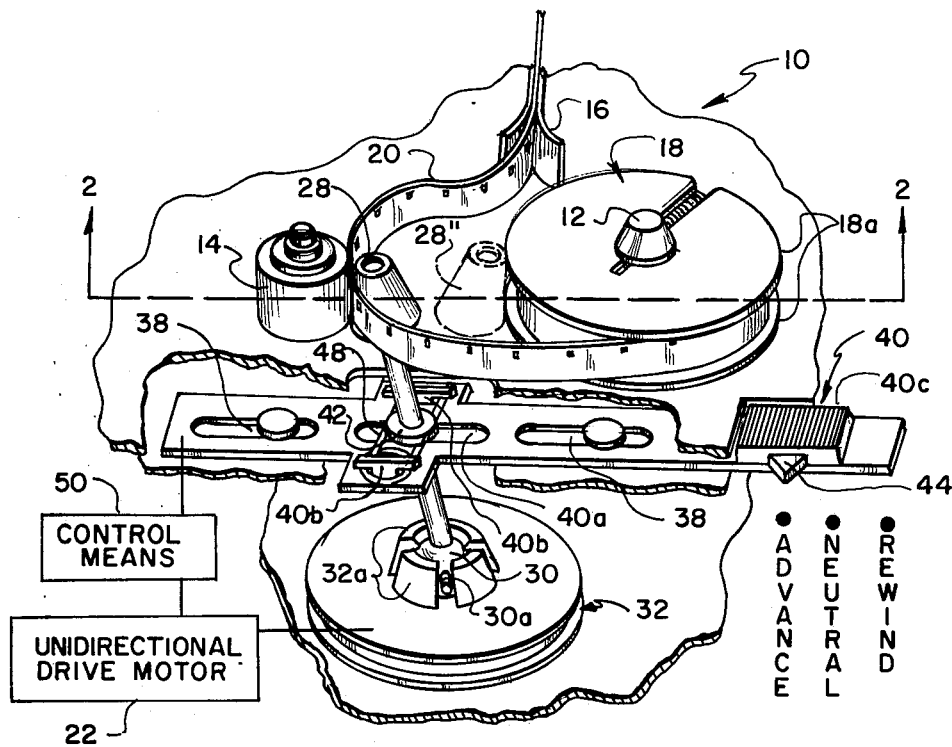
FIG. 1 is a schematic view of a web transport apparatus according to the present invention.

Web transporting apparatus of the presently preferred embodiment of the invention is shown in FIG. 1 to include a housing 10 including portions not shown for supporting, in spaced relation, a spindle 12, a rotatable pressure roller 14, and a web guide member 16. The spindle 12 is suitable to support for rotation a reel 18 having generally parallel flanges 18a. Flanges 18a are spaced to receive and support a web 20 comprising a thin, flexible strip or web such as film, magnetic tape or other similar material. The web transport apparatus may include other devices to permit scanning, viewing, exposing, processing, recording, information retrieval or any other desired purpose. Because devices permitting these activities may be selected from those known in the prior art, further discussion will be limited to the novel features of the present invention.

Unidirectional drive motor 22 (shown in block form) may be an electrical motor or other appropriate motive means supported by the housing 10. Drive motor 22 is coupled to a driving member 24 which includes an elongate shaft 26 supporting at one end an appropriately shaped capstan portion 28 and at the other end a ball portion 30. Preferably, the drive motor 22 is coupled to the driving member 24 by a flexible or universal coupling which permits the driving member to be moved throughout a range of desired positions. In a presently preferred embodiment, this coupling includes the ball portion 30 of driving member 24 and a socket or receptacle formed by fingers 32a of a drive member 32. Drive member 32 may be appropriately selected from known components such as gears, pulleys, or other drive members which are suitable for coupling the driving member 24 to the unidirectional drive motor 22. In the disclosed embodiment, drive member 32 is driven in a clockwise direction (direction of arrow 34) by the unidirectional drive motor 22 when the drive motor is operative.

Figure 2:
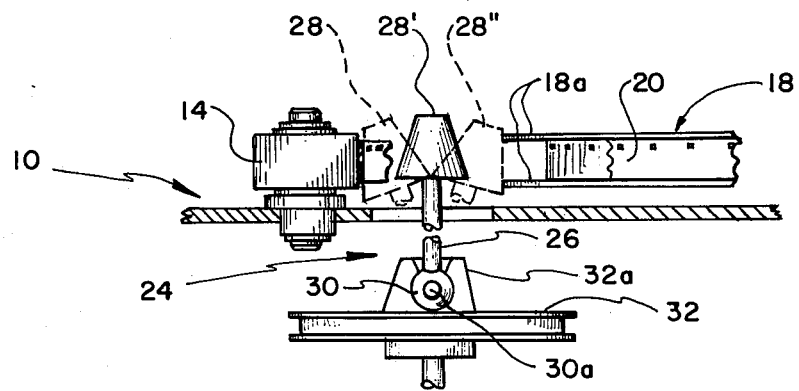
FIG. 2 is a cross-sectional veiw taken along lines 2—2 of FIG. 1 showing in greater detail a flexible coupling of the web transport apparatus.

As viewed in FIG. 2, ball portion 30 of driving member 24 includes an extension 30a received between two adjacent fingers 32a of drive member 32. Such an arrangement provides a positive driving force to driving member 24. Fingers 32a are preferably contoured to accept ball 30c in a ball-and-socket manner, permitting relative angular displacement of driving member 24 with respect to drive member 32 even while driving member 24 is rotatively driven. Preferably, the drive member 32 and the fingers 32a are both moled of plastic and the fingers 32a are sufficiently flexible to allow the ball 30 to be pressed into place. Although other universal joints or flexible couplings may be suitable, the disclosed arrangement has provided desired driving characteristics in a relatively inexpensive manner.

In the illustrated preferred embodiment of the present invention, driving member 24 may be pivotably moved with respect to the pressure roller 14 and a reel 18 by selector means 40. Selector means 40 may be supported by housing 10 through slot and pin connections 38 or other appropriate means. A bearing 42 slidably and rockably mounted in slot 40a in a central portion of selector means 40 receives shaft 30a of driving member 24. Bearing 42 permits driving member 24 to be rotatively driven by the drive means when driving member 24 is moved to alternative positions by the selector means 40. Spring member 48 of the selector means 40, which is supported in a known manner between a pair of upturned tabs 40b, engages shaft 26 to resiliently move driving member 24. The pressure exerted by spring 48 is a function of the deflection and resiliency of spring member 48. As will be appreciated, through this arrangement selector means 40 may position the capstan 28 into contact with either the pressure roller 14 or the flange 18a of reel 18 (shown at 28" in FIGS. 1 and 2) or to an intermediate position (shown at 28' in FIG. 2). While the preferred embodiment described includes positioning of the capstan 28 in contact with the pressure roller 14 and the flange 18a of reel 18, it is to be understood that other appropriate drive arrangments are contemplated by this invention. For example, spindle 12 could include a flange which could be engaged by capstan 28 to drive a received reel 18 or other core.

Selector means 40 preferably includes an adjusting element 40c that is accessible from the exterior of the housing to permit displacement of selector means 40 by the operator. Also, the selector means 40 may be provided with a suitable indicator 44 which may be aligned with the advance, neutral and rewind indicia provided on housing 10 to positively indicate the positioning of driving member 24 by selector means 40. Appropriate detent means (not illustrated) may be provided to maintain the selector means 40 in a desired position until repositioned by the operator.

In operation of the web transport apparatus in the advance position, the web 20 may be manually threaded from the reel 18, between the capstan 28 and pressure roller 14 and into the web guide 16 leading to other portions of the apparatus. As drive member 32 is driven in the clockwise direction (direction of arrow 34) by the unidirectional drive member 22, the web is advanced from the reel 18 as previously described. When selector means 40 moves drive member 24 to the rewind position, capstan 28 is moved into contact with flange 18a of reel 18 (shown at 28" in FIGS. 1 and 2) or other take-up means. The clockwise rotation of driving member 24 is imparted to capstan 28 through the flexible coupling, and reel 18 is driven to wind web 20 onto the reel.

The illustrated preferred embodiment also includes control means 50 (shown in block form) associated with both the selector means 40 and the unidirectional drive motor 22. The control means 50 preferably activates or engages the unidirectional drive motor 22 to drive the driving member 24 when the selector means is positioned in either the advance or rewind position. It is contemplated that the control means 50 may include appropriate switching means or clutching means which controls the motor 22 or other motive means responsive to positioning of the selector means 40.

While the invention has been described in considerable detail with particular reference to certain presently preferred embodiments thereof, it will be understood that variations and modifications can be effected within the spirit and scope of the invention as described hereinabove and as defined in the claims.

What is claimed is:

1. Web transport apparatus for selectively driving a web from or winding the web onto a reel, said apparatus comprising:
    (a) pressure means;
    (b) a unidirectional drive motor;
    (c) a driving member coupled to said drive motor to be rotatively driven thereby, said driving member being movable to (1) a first position for driving the web between itself and said pressure means for unwinding the web from the reel and (2) a second position for rotatively driving the reel to wind the web onto the reel; and
    (d) selector means for selectively moving said driving member to said first and second positions.

2. Apparatus as set forth in claim 1 further comprising control means coupled to said selector means and said drive motor for conditioning said drive motor to rotatively drive said driving member when said driving member is positioned by said selector means in either of said first and second positions.

3. Apparatus as set forth in claim 1 wherein said driving member is also movable by said selector means to a third position wherein said driving member is ineffective to drive the web between itself and said pressure means or to rotatively drive the reel.

4. Apparatus as set forth in claim 1 further comprising a flexible coupling which rotatively drives said driving member responsive to said drive motor and permits movement of said driving member by said selector means to said first and second positions.

5. Apparatus as set forth in claim 4 wherein said driving member includes a ball portion having at least one protrusion and wherein said web transport apparatus further comprises a drive member coupled to said drive motor, said drive member including a receptacle portion adapted to receive said ball and protrusion, said ball portion and said receptacle portion defining said flexible coupling.

6. Web transport apparatus for advancing film from and for winding the web onto a reel having a flange, said web transport apparatus comprising:
    (a) a pressure member;
    (b) a spindle for receiving the reel;
    (c) a driving member adapted to be rotatively driven and to be moved to (1) a first position for driving the web between itself and said pressure member for unwinding the web from the reel and (2) a second position for engaging the flange of the reel to rotatively drive the reel and wind the web onto the reel;
    (d) selector means for positioning said driving member to said first and second positions;
    (e) a unidirectional drive motor coupled to said driving member to rotatively drive said driving member; and
    (f) control means coupled to said drive motor and said selector means for conditioning said drive motor to rotatively drive said driving member when said selector means positions said driving member in either of said first and second positions.

7. Web transport apparatus for advancing a web and for winding the web onto a reel having a flange, said apparatus comprising:
    (a) a rotatable pressure roller;
    (b) a spindle for receiving the reel;
    (c) a driving member supported for rotational movement and movement to (1) a first position for driving the web between itself and said pressure roller, (2) a second position for rotatively driving the reel to wind the web onto the reel, and (3) a third position removed from said first and second positions;
    (d) a unidirectional drive motor conditionable for rotatively driving said driving member;
    (e) means for coupling said drive motor to said driving member for permitting said driving member to be rotatively driven by said drive motor and for permitting said driving member to be displaced to said first, second and third positions, said coupling means including a generally ball-shaped portion with at least one protrusion and a receptacle portion adapted to receive said ball-shaped portion with said protrusion;
    (f) selector means for selectively moving said driving member to said first, second and third positions; and
    (g) control means coupled to said selector means and said drive motor for conditioning said drive motor to rotatively drive said driving member when said driving member is positioned by said selector means in either of said first and second positions.

8. A web driving mechanism as set forth in claim 7 wherein said driving motor is conditioned by said control means to be ineffective to rotatively drive said driving member when said driving member is positioned by said selector means in said third position.

9. Web transport apparatus for selectively driving a web from or winding the web onto a reel, said apparatus comprising:
 (a) a pressure roller;
 (b) spindle means for receiving the reel;
 (c) a unidirectional drive motor;
 (d) a member coupled to said drive motor, said member including a receptacle portion;
 (e) a driving member including a ball shaped portion with at least one protrusion received by said receptacle portion to couple said driving member to said drive motor to be rotatively driven thereby, said driving member being movable to (1) an advance position wherein said driving member is in pressure engagement with and rotatively drives the pressure roller to advance the web between itself and said pressure roller (2) a rewind position wherein said driving member engages and rotatively drives the reel to wind the web onto the reel, and (3) a neutral position wherein said driving member is disengaged from said pressure roller and the reel;
 (f) selector means for selectively moving said driving member to said advance, rewind and neutral positions; and
 (g) control means coupled to said selector means and said drive motor for conditioning said drive motor to rotatively drive said driving member only when said driving member is positioned by said selector means to said advance and rewind positions.

* * * * *